Figure 1:
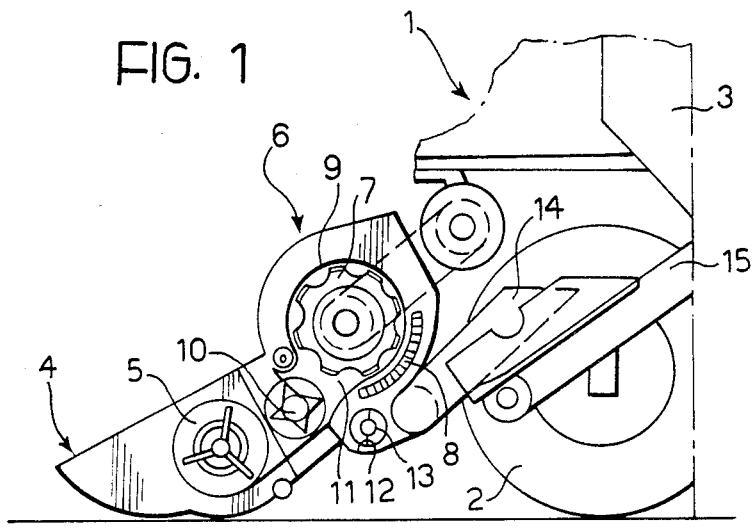

United States Patent [19]
Raineri

[11] Patent Number: 4,718,434
[45] Date of Patent: Jan. 12, 1988

[54] AXIAL-FLOW THRESHER-SEPARATOR UNITS FOR COMBINE HARVESTERS

[75] Inventor: Giuseppe Raineri, Bassasno del Grappa, Italy

[73] Assignee: Pietro Laverda S.p.A., Breganze, Italy

[21] Appl. No.: 932,414

[22] Filed: Nov. 19, 1986

[30] Foreign Application Priority Data

Nov. 19, 1985 [IT] Italy ............................. 54061/85[U]

[51] Int. Cl.$^4$ ............................................. A01F 12/00
[52] U.S. Cl. ................................ 130/27 J; 130/27 H; 130/27 P
[58] Field of Search ................... 130/27 R, 27 J, 27 H, 130/27 T, 27 P

[56] References Cited

U.S. PATENT DOCUMENTS

| | | | |
|---|---|---|---|
| 4,108,150 | 8/1978 | Shaver | 130/27 H |
| 4,154,250 | 5/1979 | Stuber | 130/27 H |
| 4,180,081 | 12/1979 | Shaver | 130/27 R |
| 4,222,395 | 9/1980 | Johnston et al. | 130/27 H |
| 4,274,426 | 6/1981 | Williams | 130/27 T |
| 4,337,781 | 7/1982 | Brundage | 130/27 H |
| 4,461,306 | 7/1984 | DeBusscher | 130/27 T |

*Primary Examiner*—Paul J. Hirsch
*Attorney, Agent, or Firm*—Sughrue, Mion, Zinn, Macpeak, and Seas

[57] ABSTRACT

An axial-flow thresher-separator unit for combine harvesters comprises at least one elongate member for cleaning the outer surface of the separator casing which extends parallel to the axis of the thresher-separator cylinder and is movable on the outer surface of the separator casing. The elongate member is connected to a pair of chains driven by gears. Means are arranged to transmit an alternating rotary movement to the gears. Each chain is an open loop and is guided within a double rail constituted by two parallel strips located above and beneath the pins of the chain. The longitudinal edges of each strip slidably engage the facing surfaces of the two plates constituting each inner link of the chain.

3 Claims, 6 Drawing Figures

AXIAL-FLOW THRESHER-SEPARATOR UNITS FOR COMBINE HARVESTERS

The present invention relates to combine harvesters having an axial-flow thresher-separator unit.

More particularly, the invention relates to an axial-flow thresher-separator unit for combine harvesters, of the type comprising:

a thresher-separator cylinder, a separator casing in the form of a perforated tubular body surrounding the thresher-separator cylinder, at least one elongate member for cleaning the outer surface of the separator casing, which extends parallel to the axis of the thresher-separator cylinder and is movable on the outer surface of the separator casing along portions of circular arcs lying in a plane substantially perpendicular to the axis of the thresher-separator, a pair of chains slidable in planes substantially perpendicular to the axis of the thresher-separator cylinder, to which the ends of the elongate members are joined, a pair of gears joined by a shaft, each of which meshes with one of the chains so that their rotation causes the translation of the chains, and means for rotating the gears, A thresher unit of the type described above is the subject of European Patent No. 0070260 corresponding to the Italian Pat. Application No. 67968-A/81, both by the same Applicants.

In the solution described therein, the elongate members for cleaning the outer surface of the separator casing are connected at their ends to endless chains which are located on the outer surface of the separator casing along portions of circular arcs lying in a plane perpendicular to the axis of the thresher-separator cylinder so that each chain has an inner portion facing the surface of the separator casing and an outer portion. The chains are always driven in the same direction. Thus, the elongate cleaning members move along the portion adjacent to the separator casing in one direction and along the outer portion in the opposite direction. Even though the outer portion is further from the surface of the casing than the inner portion, the cleaning action of the elongate members occurs when the elongate member moves over both these said portions.

This solution has several disadvantages. In particular, the fact that the chain is an endless loop means that its tension must be adjusted. Moreover, the cleaning members, sliding on two superposed portions, occupy a considerable radial space and, in addition, by sliding in opposite senses, can easily interfere with each other.

The object of the present invention is to provide a thresher-separator unit which does not have these disadvantages.

This object is achieved according to the invention by a thresher-separator unit of the type described above, characterised in that the means are arranged to transmit an alternating rotary movement to the gears, in that each of the chains is an open loop and is guided within a double rail constituted by two parallel strips located above and beneath the pins of the chain, and in that the longitudinal edges of each strip slidably engage the facing surfaces of the two plates constituting each inner link of the chain.

Figure 4:
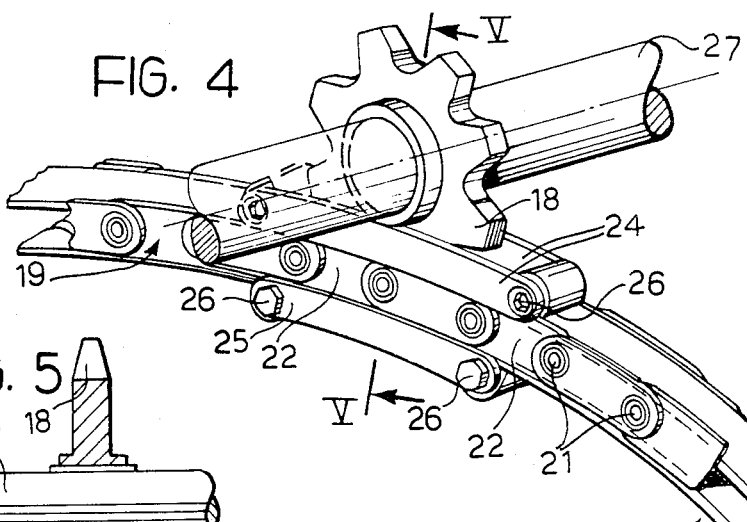
Figure 5:
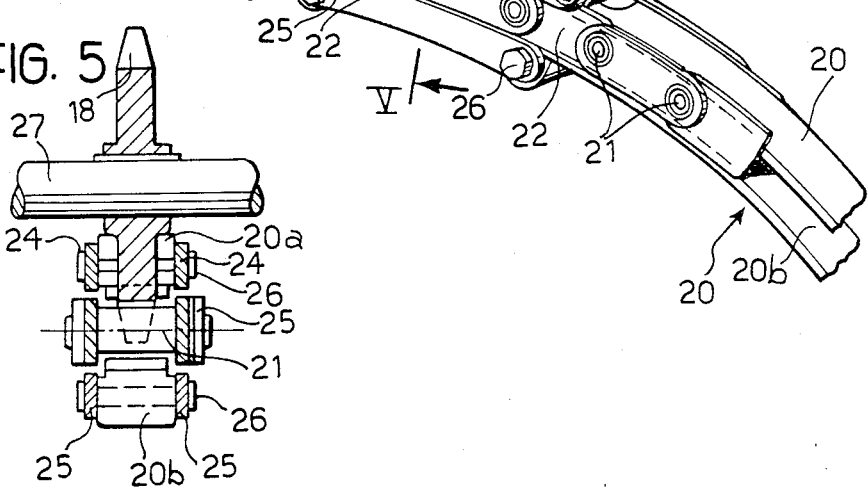
Figure 2:
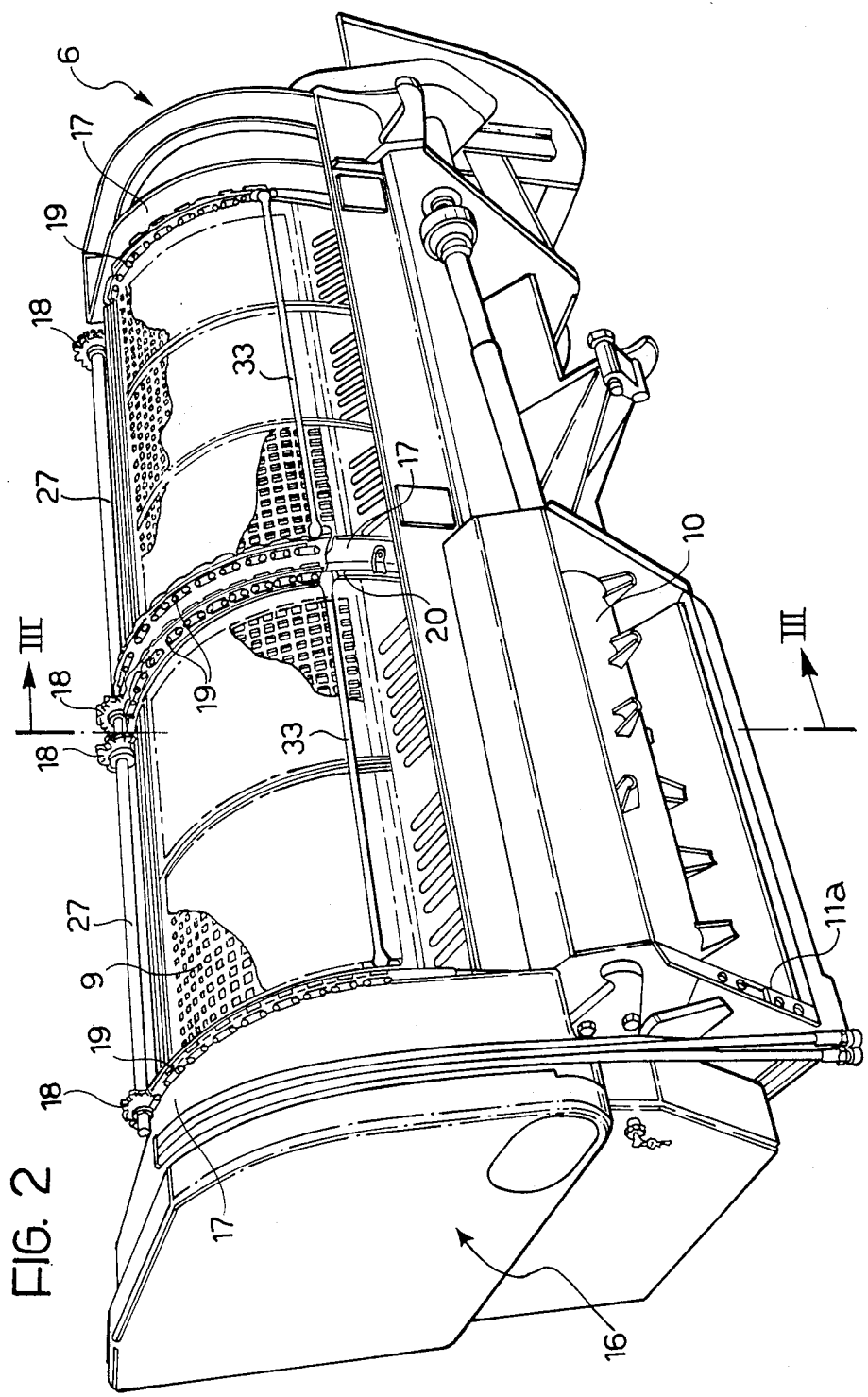
Figure 3:
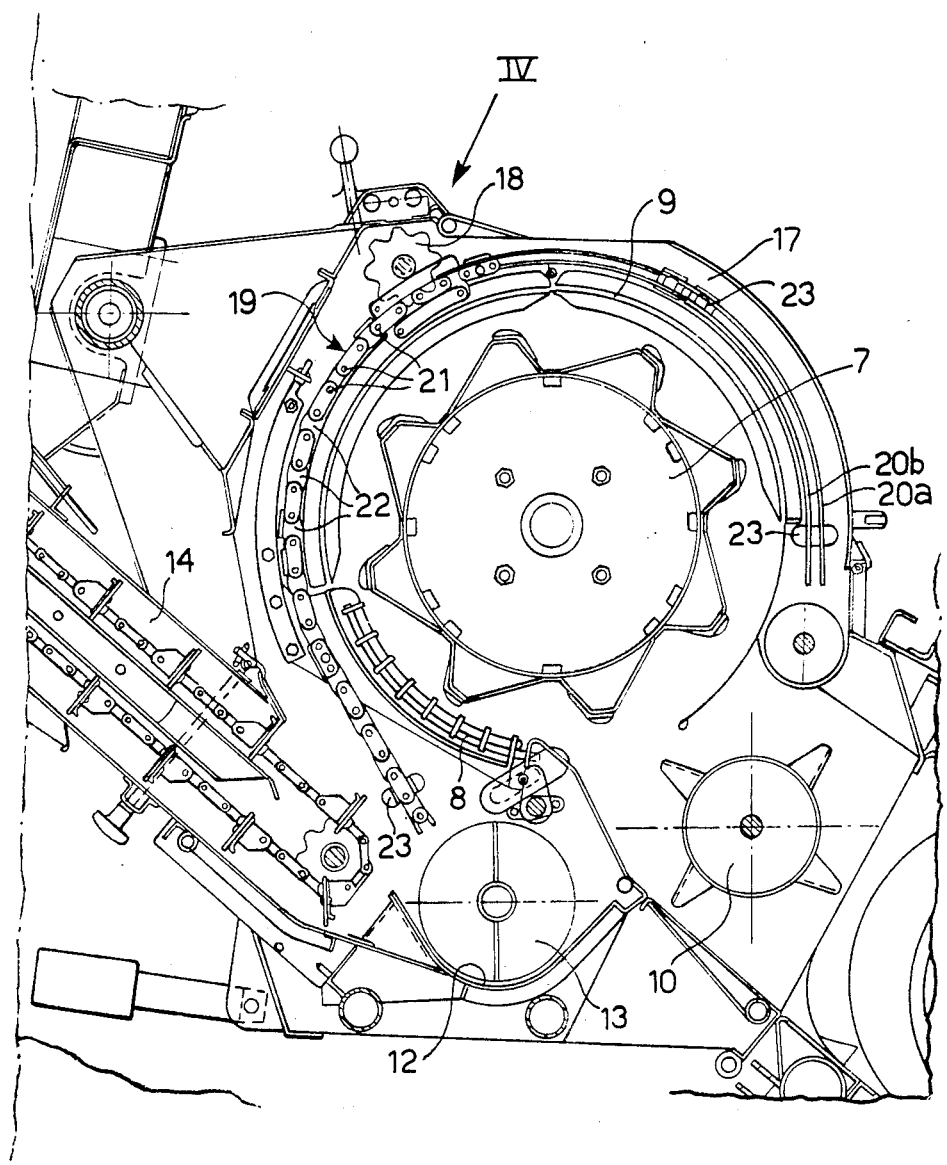
Figure 6:
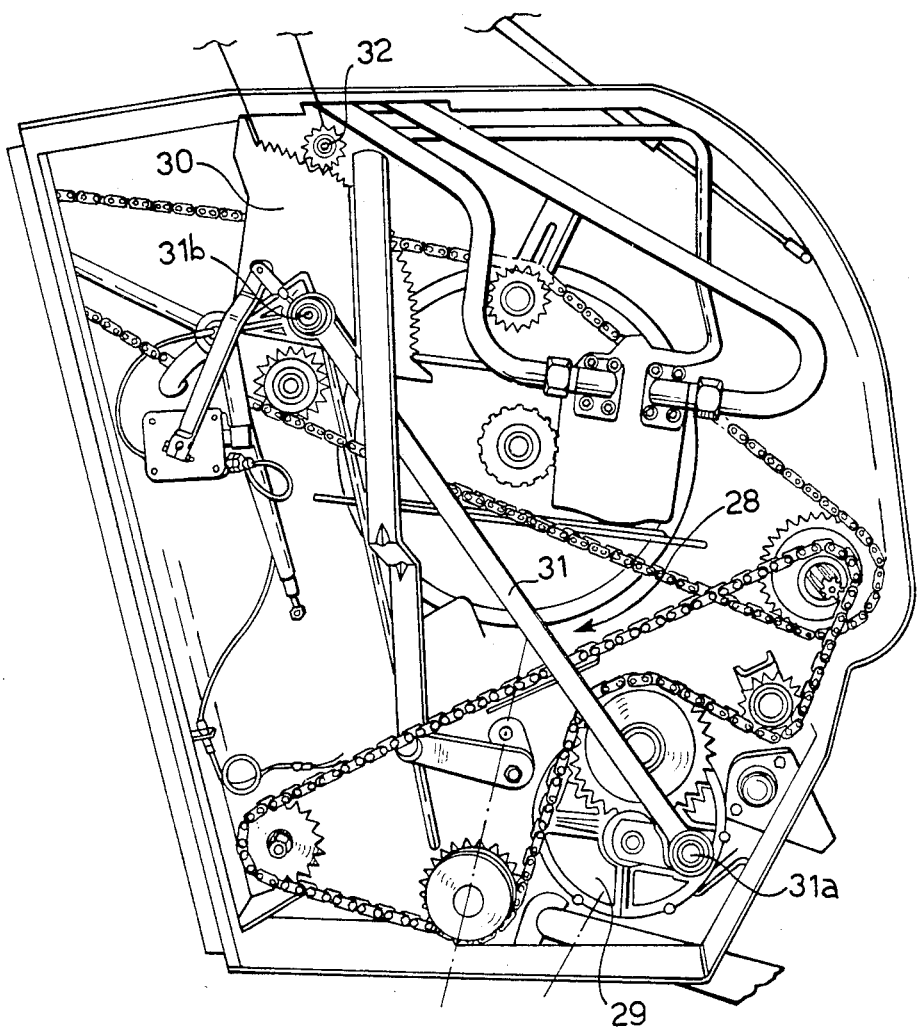

Further characteristics and advantages of the present invention will become apparent from the description which follows with reference to the appended drawings, provided purely by way of non-limiting example, in which:

FIG. 1 is a schematic side view of the front part of a combine harvester provided with a thresher-separator unit according to the present invention, FIG. 2 is a perspective view of the thresher-separator unit of the invention, FIG. 3 is a sectional view taken on the line III—III of FIG. 2, FIG. 4 is an enlarged perspective view of a detail of FIG. 3, FIG. 5 is a sectional view taken on the line V—V of FIG. 4, and FIG. 6 illustrates a detail of the machine of FIG. 1 on an enlarged scale.

The combine harvester illustrated in FIG. 1, generally indicated 1, is of the general type described and illustrated in Italian Patent Application No. 53321-B/80 filed by the same Applicants.

It is clear, however, that the thresher-separator unit according to the present invention can also be applied to combine harvesters of a type different from that illustrated.

With reference to FIG. 1, the combine harvester includes wheels 2 (only the front ones of which are visible in the drawing) on which is mounted a fixed structure 3.

The combine harvester 1 is provided at its front end with a cutting platform 4 including a feed screw 5 of known type.

Behind the feed screw 5 is a thresher-separator unit 6 of the axial-flow type, which is illustrated in perspective in FIG. 2.

The thresher-separator unit 6 includes a thresher-separator cylinder located transverse the longitudinal axis of the machine. A counter-thresher 8 constituted by a concave surrounds the lower portion of the thresher-separator cylinder 7, and a separator casing 9 constituted by a perforated tubular body surrounds the part of the cylinder 7 which is not covered by the counter-thresher 8.

The separator casing 9 has an aperture 11 (see FIG. 1) at one end, through which the harvested crop is intended to be supplied to the space between the cylinder 1 and the casing 9. The thresher-separator unit 6 includes a fixed support structure 16 (see FIG. 2) forming a mouth 11a for conveying the crop in correspondence with the aperture 11 in the separator casing 9.

A transverse feed roller 10 is disposed in the opening 11a for receiving the product from the screw 5 and conveying it to the unit 6.

The crop supplied to the interior of the separator casing 9 follows a helical path around the thresher-separator cylinder 7 and moves towards the opposite end of the cylinder. When it reaches this end, the material which has not passed through the apertures in the separator casing is discharged directly to the ground so as to form a line to one side of the harvester. The remaining material separated during the movement of the crop around the thresher cylinder, however, falls below the separator casing 9 and is deposited on a collecting base 12 (see FIG. 1) located beneath the thresher-separator unit 6.

In the practical embodiment illustrated, the harvester has a screw 13 which is located in correspondence with the collecting base 12 and conveys the grain towards the loading end of a blade elevator 14 which conveys the grain, through a second elevator 15, to the cleaning members (not illustrated) located in the rear part of the harvester. These members are of known type and do not fall within the scope of the present invention.

FIG. 2 is a perspective view of the thresher-separator unit 6 without the thresher-cylinder 7.

The fixed support structure 16 of the unit 6 includes three ribs 17 located at the ends and in the central zone of the separator casing 9, respectively.

The ribs 17, constituted by sheet metal panels located in planes perpendicular to the axis of the thresher-separator cylinder, rotatably support pulleys 18 (see FIG. 3) on which two pairs of open-loop chains 19 are engaged.

As illustrated in detail in FIG. 3, each chain 19 engaged with one of the pulleys 18 is guided within a double rail 20 constituted by two parallel strips 20a, 20b located above and below the pins 21 of the chain 19. The longitudinal edges of each strip 20a, 20b slidably engage the facing surfaces of the two plates 22 constituting each inner link of the chain 19.

The double rail 20 is fixed to the ribs 17 by support members 23.

The double rail is interrupted in the zone of meshing between the gear 18 and the chain 19. This zone is shown in perspective in FIG. 4, on an enlarged scale, while FIG. 5 is a section taken on the line V—V of FIG. 4. In this zone, the chain 19 is supported by two upper vertical plates 24 and two lower vertical plates 25, the longitudinal facing edges of which slidably engage the corresponding longitudinal edges of the plates 22 constituting the inner links of the chain. The two portions of the upper strip 20a facing the zone of meshing between the gear and the chain are bent so as to form an eyelet within which is inserted a bolt 26 constituting the element for fixing the vertical plates 24 to the two portions of strip 20a. The two lower plates 25 are similarly connected to the two portions of strip 20b.

The two pulleys 18 are rotatably interconnected by a shaft 27 which is driven to effect an alternating rotary movement by means of a crank and connecting rod transmission 28 illustrated in detail in FIG. 6. This transmission includes a rotary disc 29 pivoted on the fixed structure, a toothed sector 30 also pivoted on the fixed structure, and a connecting rod 31 pivoted at one end 31a to a point on the periphery of the disc 29 and at its other end 31b to a point on the toothed sector spaced from its point of pivoting to the fixed structure. The toothed sector engages a sprocket 32 which is fixed to the shaft 27 carrying the gears 18.

The four chains 19 support, in pairs, a pair of rods 33 which are intended to act as cleaning members to prevent any separated material accumulating in the upper part of the separator casing 9.

Each rod 33 is fixed at its two ends to the corresponding chains 19.

During operation of the harvester, the chains 19 are driven so as to cause the rods 33 to reciprocate on a cylindrical sector adjacent the upper part of the outer surface of the separator casing 9, thus removing any material which tends to accumulate in this zone.

I claim:

1. An axial-flow thresher-separator unit for combine hervesters, comprising:
   a thresher-separator cylinder,
   a separator casing in the form of a perforated tubular body surrounding the thresher-separator cylinder,
   at least one elongate member for cleaning the outer surface of the separator casing, which extends parallel to the axis of the thresher-separator cylinder and is movable on the outer surface of the separator casing along portions of circular arcs lying in a plane F substantially perpendicular to the axis of the thresher-separator,
   a pair of chains slidable in planes substantially perpendicular to the axis of the thresher-separator cylinder, to which the ends of the elongate members are joined,
   a pair of gears joined by a shaft, each of which meshes with one of the chains so that their rotation causes the translation of the chains, and
   means for rotating the gears, wherein said means are arranged to transmit an alternating rotary movement to the gears, wherein each of the chains is an open loop and is guided within a double rail constituted by two parallel strips located above and beneath the pins of the chain, and wherein the longitudinal edges of each strip slidably engage the facing surfaces of the two plates constituting each inner link of the chain.

2. Theresher-separator unit according to claim 1, wherein the double rail is interrupted in the zone of meshing between the gear and the chain, and wherein the chain is supported in this zone by two upper vertical plates and two lower vertical plates, the longitudinal facing edges of which slidably engage the corresponding longitudinal edges of the plates constituting the inner links of the chain.

3. Thresher-separator unit according to claim 1, wherein the means for rotating the gears are constituted by a crank and connecting rod system including a rotary disc, a toothed sector pivoted at a fixed point and engaging a sprocket fixed to the shaft of the gears, and a connecting rod pivoted at one end to a point on the periphery of the disc and at the other end to a point on the toothed sector spaced from its fixed pivot point.

* * * * *